United States Patent [19]

Kawahara

[11] Patent Number: 5,519,545
[45] Date of Patent: May 21, 1996

[54] DIGITAL SIGNAL RECORDING CIRCUIT USING A ROTARY TRANSFORMER WITH A REDUCED-JITTER LOW-FREQUENCY COMPENSATION CIRCUIT

[75] Inventor: Minoru Kawahara, Kanagawa, Japan

[73] Assignee: Sony Corporation, Tokyo, Japan

[21] Appl. No.: 350,016

[22] Filed: Nov. 29, 1994

[30] Foreign Application Priority Data

Nov. 30, 1993 [JP] Japan ................... 5-326154

[51] Int. Cl.⁶ .................................... G11B 5/09
[52] U.S. Cl. ................................ 360/46; 360/51
[58] Field of Search .................. 360/41, 46, 51, 360/65, 68; 358/335, 339

[56] References Cited

U.S. PATENT DOCUMENTS

| | | | |
|---|---|---|---|
| 4,251,886 | 2/1981 | Roza | 375/18 |
| 4,296,445 | 10/1981 | Schowe, Jr. | 360/46 |
| 4,561,027 | 12/1985 | Sita et al. | 360/46 |
| 4,837,617 | 6/1989 | Brusewitz | 358/133 |
| 4,918,633 | 4/1990 | Sullivan | 364/574 |

FOREIGN PATENT DOCUMENTS 63-224008  9/1988  Japan.

OTHER PUBLICATIONS 63-224008, JP Abstract, "Digital Signal Recording Device" Jan. 18, 1989.

*Primary Examiner*—W. Chris Kim
*Attorney, Agent, or Firm*—Jay H. Maioli

[57] ABSTRACT

A digital signal recording circuit for transmitting data signals and clock signals over respective rotary transformers quantizes the data signals transmitted by the rotary transformer and feeds back the quantized data signals. The data signals quantized and fed back in this manner are latched by the clock signals transmitted by rotary transformer. With the present digital signal recording circuit, broad-range signals of from the direct current to a high frequency may be transmitted for recording correct data signals.

4 Claims, 10 Drawing Sheets

FIG.6(A) TO ADDER ← 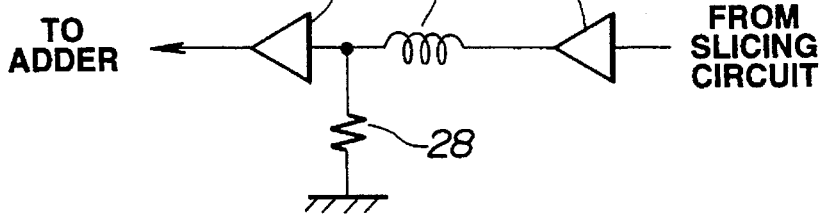 FROM SLICING CIRCUIT
FIG.6(B) TO ADDER ← 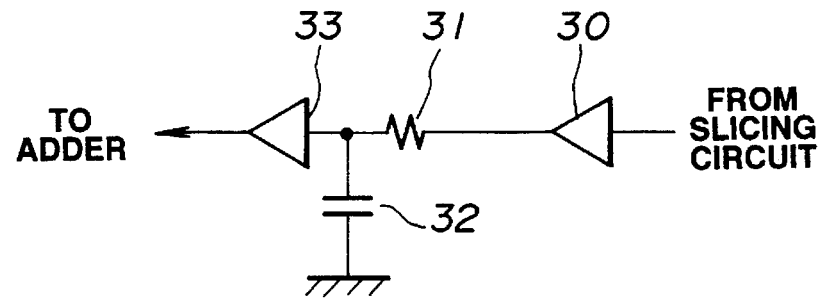 FROM SLICING CIRCUIT 5,519,545

DIGITAL SIGNAL RECORDING CIRCUIT USING A ROTARY TRANSFORMER WITH A REDUCED-JITTER LOW-FREQUENCY COMPENSATION CIRCUIT

BACKGROUND OF THE INVENTION

This invention relates to a digital signal recording circuit for recording digital video or audio signals on a magnetic tape using a rotary head.

Recently, attempts have been made in a digital video tape recorder or a digital audio tape recorder to shorten the wavelength of data signals and to increase the speed and frequency for realizing large capacity and high recording density and speed. Consequently, for recording data signals on a magnetic tape, it becomes necessary to improve precision and performance of a rotary transformer employed for transmitting data signals to the rotary head.

The rotary transformer transmits data signals to the rotary head while it is electrically coupled to but mechanically separated from the rotary head. The closer the coupling coefficient to unity, the more efficiently data signals can be transmitted from a primary coil as a stationary side to a secondary coil as a rotary side.

Among digital signal recording/ reproducing apparatus, transmitting data to the rotary head using such a rotary transformer, a typical conventional digital signal recording circuit will be explained by referring to FIG. 1.

To an input terminal 51 of the conventional digital signal recording circuit are fed data signals via a digital signal processing system of a preceding stage, not shown. These data signals are supplied to a data terminal D of a D-flipflop circuit 53, a clock input terminal CL which is fed via an input terminal 52 with clock signals produced by the digital signal processing system. The data signals thus supplied via an input terminal 51 from the digital signal processing system are synchronized and wave-shaped by the D-flipflop circuit 53 and thence fed to the primary coil of the rotary transformer 54.

The rotary transformer 54 transmits the data signals supplied to its primary coil from the D-flipflop circuit 53 to its rotating secondary coil positioned with a minor gap from the primary coil. The signals transmitted to the secondary coil are supplied via a differential amplifier 55 to bi-level means, such as a slicer 56, and thereby turned into bi-level signals, which are then supplied from the slicer 56 to a magnetic head 58 via an amplifier circuit 57. The magnetic head 58 records the bi-level data signals on the magnetic tape.

However, it is not possible with the rotary transformer 54 to transmit DC and low-frequency components of the signals supplied to its primary coil. That is, the low-frequency components are lost from the transmitted data signals since the rotary transformer 54 cuts off the low-frequency components of the transmitted data signals.

The low-range cut-off characteristics of the rotary transformer are attributable to the inductance of the rotary transformer and the resistance of other neighboring circuits, such as a signal source. FIG. 2 shows frequency versus amplitude characteristics of the rotary transformer shown by an equivalent circuit of FIG. 4. In the equivalent circuit of FIG. 4, $C_{p1}$=5 pF, $L_0$=10 μH, k (=coupling coefficient)=0.98, $C_{p2}$=5 pF and $R_L$=100 ohms.

If the signal source resistance is set to 100 or 200 ohms, the signal amplitude is acutely lowered for the frequencies of not higher than 1 MHz. For example, if the signal source resistance R is 100 ohms, the equivalent circuit shown in FIG. 4 is equivalent in operation to a first-order high-pass filter (HPF) having a cut-off frequency fc equal to 1 MHz. The result is that, even if the voltage waveform of the signal source is a distortion-free rectangular wave, the voltage waveform of the output signal appearing at both ends of a load resistor $R_L$ is susceptible to so-called sag. If the signal source resistance R is set to 5 ohms, the cut-off frequency fc can be set to 0.3 MHz or thereabouts. It is, however, still not possible to transmit DC components. On the other hand, if the signal source resistance R is set to 5 ohms, delay characteristics are deteriorated, as shown in FIG. 3.

In order to cope with interruption of the low-frequency signals, attempts have been made to constitute an inverse circuit by a network comprising coils and capacitors. However, such a network has not been put to practical use because it is, however, not possible with such an inverse circuit to transmit the DC components and, besides, such an inverse circuit leads to an increased circuit scale.

There has also been known a method of narrowing the range of the data signals by phase modulation for producing data signals suited to the rotary transformer characteristics and transmitting these narrow range data signals. However, such a method cannot be adapted to higher transmission rates because the upper limit of the transmission range required in such a case is doubled and hence the transmitted signals are lowered in amplitude by high-range interruption and the waveform is susceptible to rounding.

Thus there lacks up to now a method effective in compensating for low-range cut-off characteristics of the rotary transformer. The result is that, if a signal free of transitions is supplied to a system employing the rotary transformer having the above-mentioned low-range cut-off characteristics, the low-range amplitude is attenuated exponentially. Should the amplitude of the low-range components become lower than the noise level or the offset level of the input to a differential amplifier circuit, correct data signals cease to appear at outputs of the bi-level means or the wave-shaping means, resulting in incorrect timing of the inversion of the recording magnetization. In the worst case, data signal dropout is incurred and affects the patterns of recording magnetization to render it impossible to record correct data signals.

OBJECT AND SUMMARY OF THE INVENTION

In view of the above-described status of the prior art, it is an object of the present invention to provide a data signal recording circuit whereby correct data signals can be recorded by compensating low-range cut-off characteristics of the rotary transformer for realization of transmission over a wide range from DC to a high frequencies.

The present invention provides a digital signal recording circuit for transmitting data signals and clock signals by respective rotary transformers, comprising quantization feedback means for performing quantization and feedback on the data signals transmitted from one of the rotary transformers, and latching means for latching data signals quantized and fed back by the quantization feedback means by clock signals transmitted by the other of the rotary transformers.

The digital signal recording circuit may include means for dividing the frequency of the clock signals supplied to the other of the rotary transformers and frequency step-up means for stepping up the frequency of the frequency-divided clock signals transmitted by the rotary transformer.

The feedback ratio of the quantization feedback means is preferably set to less than unity.

The rotary transformer may include a plurality of signal transmitting channels and clock signals transmitted over one of the channels may be used in common for latching a plurality of data signals transmitted over a plurality of other channels.

The digital signal recording circuit may comprise bi-level means for converting data signals transmitted by the rotary transformer into two-level signals. It is possible for the quantization feedback means to differentially take out the bi-level output from the bi-level means and feed back the thus taken out bi-level output.

According to the present invention, the data signals transmitted from the rotary transformer are quantized and fed back by quantization feedback means, and the data signals thus quantized and fed back are latched by latch means with the clock signals transmitted from the rotary transformer. Thus the low frequency range cut-off characteristics of the rotary transformer may be compensated and signal transmission over an extremely wide range from direct current to high frequencies may be realized to enable recording of correct data signals.

In addition, the digital signal recording circuit according to the present invention includes means for dividing the frequency of the clock signals supplied to the other of the rotary transformers and frequency step-up means for stepping up the frequency of the frequency-divided clock signals transmitted by the rotary transformer, whereby jitter may be diminished effectively.

BRIEF DESCRIPTION OF THE DRAWINGS

FIGS. 6(A)–6(B) is a circuit diagram showing a practical quantization feedback circuit employed in the digital signal recording circuit shown in FIG. 5.

DESCRIPTION OF PREFERRED EMBODIMENTS

Figure 1:
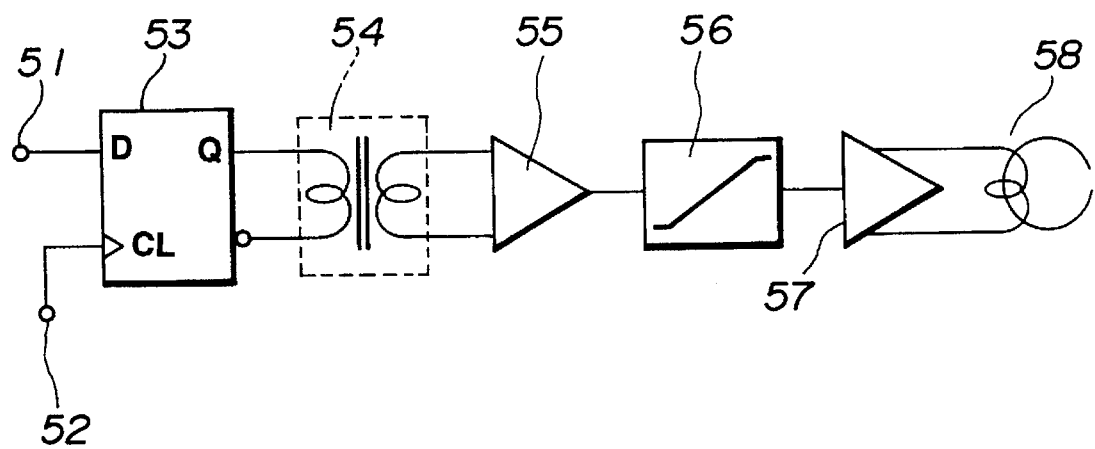
FIG. 1 is a schematic block circuit diagram showing an arrangement of a conventional digital signal recording circuit.
Figure 2:
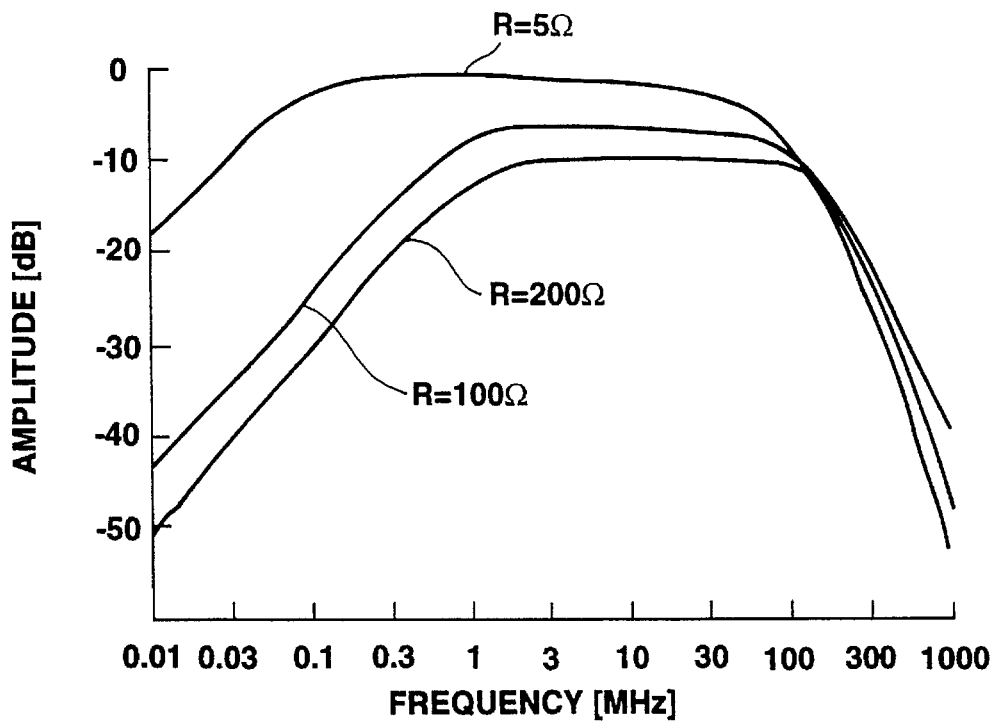
FIG. 2 is a graph showing amplitude characteristics of a rotary transformer.
Figure 3:
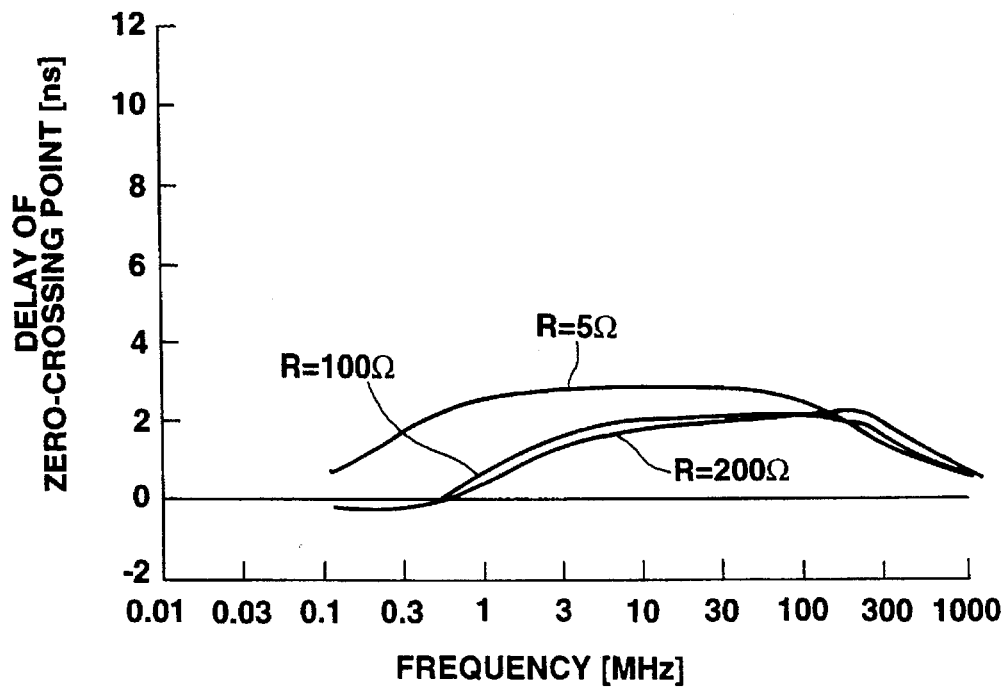
FIG. 3 is a graph showing delay characteristics of zero-crossing points during transmission of a rectangular wave by a rotary transformer.
Figure 4:
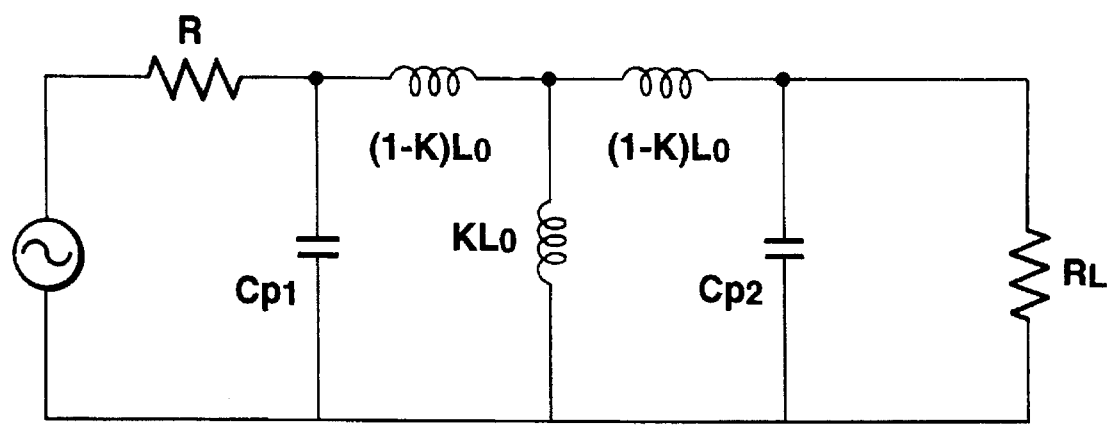
FIG. 4 is a circuit diagram showing an equivalent circuit of a rotary transformer.

Referring to the drawings, preferred embodiments of the digital signal recording circuit according to the present invention will be explained in detail.

Figure 5:
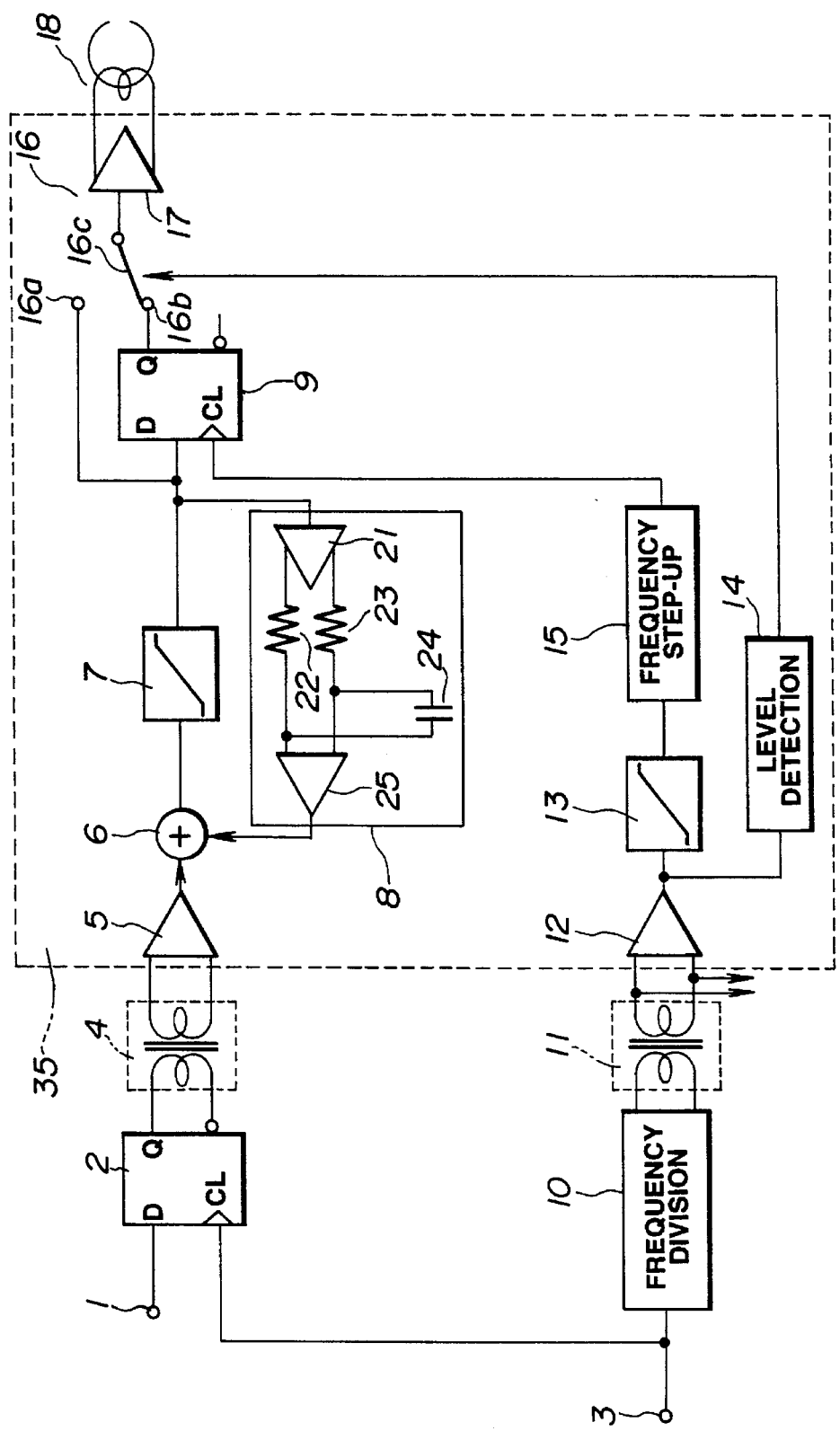
FIG. 5 is a block diagram showing a schematic arrangement of a first embodiment of a digital signal recording circuit according to the present invention.

The first embodiment of the digital signal recording circuit according to the present invention is first explained by referring to FIG. 5, which is a schematic block circuit diagram of the first embodiment. Data signals are supplied as NRZ signals with the transfer rate of 110 Mbits per second (Mbps). Thus the maximum basic frequency of the data signals is 55 MHz, with the window margin during reproduction of 9.09 nsec.

Digital video signals of the maximum basic frequency of 55 MHz are fed from the digital signal processing system of the preceding stage to an input terminal 1 of the present digital signal recording circuit. These digital video signals are fed to a data terminal D of a D-flipflop circuit 2, the clock input terminal CL of which is fed with clock signals from the digital signal processing system via an input terminal 3. The frequency of the clock signals is twice the maximum basic frequency 55 MHz of the video data signals, that is, 110 MHz.

Data signals are output from an output terminal Q of the D-flipflop circuit 2 and thence fed to the primary coil of a data channel 4 of a rotary transformer.

The data channel 4 of the rotary transformer transmits data signals fed to a coil of the primary side, that is, the stationary side, to a coil of the secondary side, that is, the rotary side. By the data channel 4, the low-frequency components of the data signals transmitted to the rotary side are cut off by characteristics of the rotary transformer. Besides, the transmitted signals become jitter-containing data signals due to transmission distortion. The data signals, the low range components of which are cut off by the transmission distortion and in which jitter is contained by the transmission distortion, are fed via a differential amplifier circuit 5 to an adder 6.

Output signals of the adder 8 are fed to a slicer 7 which converts the input signals into bi-level signals or otherwise wave-shapes the input signals. The slicer 7 converts the transmitted data signals into discrete signals, that is, into bi-level signals, depending on whether the input transmission data signals exceed a pre-set level. The transmission data signals, converted into the bi-level signals, are signals converted from data signals, the low range components of which are cut off by the data channel 4 of the rotary transformer and in which jitter is contained by the transmission distortion. These bi-level signals are fed to a quantization feedback circuit 8.

The quantization feedback circuit 8 comprises a differential amplifier circuit 21 having a differential output, a differential amplifier circuit 25 having a differential input, two signal lines respectively made up of resistors 22, 23 and interconnecting the amplifier circuits 21, 25, and a capacitor 24 connected across the two signal lines. The function of the capacitor 24 is to enable the time constant to be changed as desired depending on prevailing conditions and to reduce the adverse effects of disturbances as well as to enable the feedback quantity control and by-pass control to be performed easily. That is, by inserting the resistors 22, 23 in the two signal lines, the feedback quantity may be controlled by these resistors so that various input amplitudes may be coped with. It is also possible to inhibit quantization feedback by short-circuiting the two signal lines by conductors, the feedback quantity then being zero.

The quantization feedback circuit 8 may be configured as shown in FIG. 6.

That is, the quantization feedback circuit 8 may be made up of a series connection of a differential amplifier circuit 26, a coil 27 and a differential amplifier circuit 29, and a resistor 28 connected at its one end to a point between the coil 27 and the differential amplifier circuit 29 and its other end grounded, as shown at A in FIG. 6. Alternatively, it may be made up of a series connection of a differential amplifier circuit 28, a resistor 27 and a differential amplifier circuit 29, and a capacitor 31 connected at its one terminal to a point between the resistor 27 and the differential amplifier circuit 33 and its other terminal grounded, as shown at B in FIG. 6.

The quantization feedback circuit 8 amplifies data signals obtained by discretely quantizing bi-level signals supplied from the slicer, that is, output signals of the adder 8, and routes the amplified data signals to the adder 8. The adder 8 is fed with the jitter-containing data signals, the low frequency components of which are cut off by the data channel 4 of the rotary transformer, as discussed above. However, these input data signals are augmented to by addition with the above data signals quantized by the quantization feedback circuit 8, so that the resulting data signals are compensated for the cutoff low- frequency components.

With the quantization feedback circuit 8, the time constant as found as the product of the inductance of the rotary transformer and the resistance of the amplifier circuitry, is realized by the resistors 22, 23 and the capacitor 24. That is, while the rotary transformer has filter characteristics of the first-order high-pass filter (HPF), the quantization feedback circuit 8 has filter characteristics of a low-pass filter complementary to the high-pass filter. Thus the adder 6 sums the data signal whose low range components have been cut off and the data signal whose low range components have been cut off and whose high range components have also been cut off, that is, the signal with the rounded waveform, so that the data signal having the same waveform as the signal prior to being fed to the rotary transformer, that is, the data signal free of low range cut-off, is now fed to the slicer 7.

The data signal, thus compensated for interruption of the low-range components, is converted by the slicer 7 into a bi-level signal, which is fed to a data terminal D of a D-flipflop circuit 9, functioning as a latching means.

The quantization feedback circuit 8 basically can be driven at a low speed, so that the power consumption with the digital signal recording circuit of the present first embodiment is negligibly small.

Meanwhile, the quantization feedback by the quantization feedback circuit 8 may be controlled by the circuit arrangement shown in FIG. 5. It is, however, necessary to perform sufficient waveform equalization if it is desired to achieve complete compensation for the data signal, the low range components of which have been cut off by 100% quantization feedback. The main objective of effecting the sufficient waveform equalization is to eliminate the jitter completely. However, if the data signal is insufficient in amplitude due to deterioration in the high frequency range, the input signal cannot be converted into high or low level signals, as a result the signal is fixed at high or low level even though the data signal is changing in amplitude. This also accounts for effecting the waveform equalization.

If the quantization feedback of the quantization feedback circuit 8 is set to, for example, 50%,instead of 100%, broad-range transmission, inclusive of a dc component, becomes possible, although jitter is still left. The relation between the quantity of quantization feedback and the range of transmission is explained by referring to FIG. 7, which illustrates how the measured delay time length is changed with changes in the quantity of quantization feedback by the quantization feedback circuit 8 of the data signal transmitted by the rotary transformer.

Figure 7:
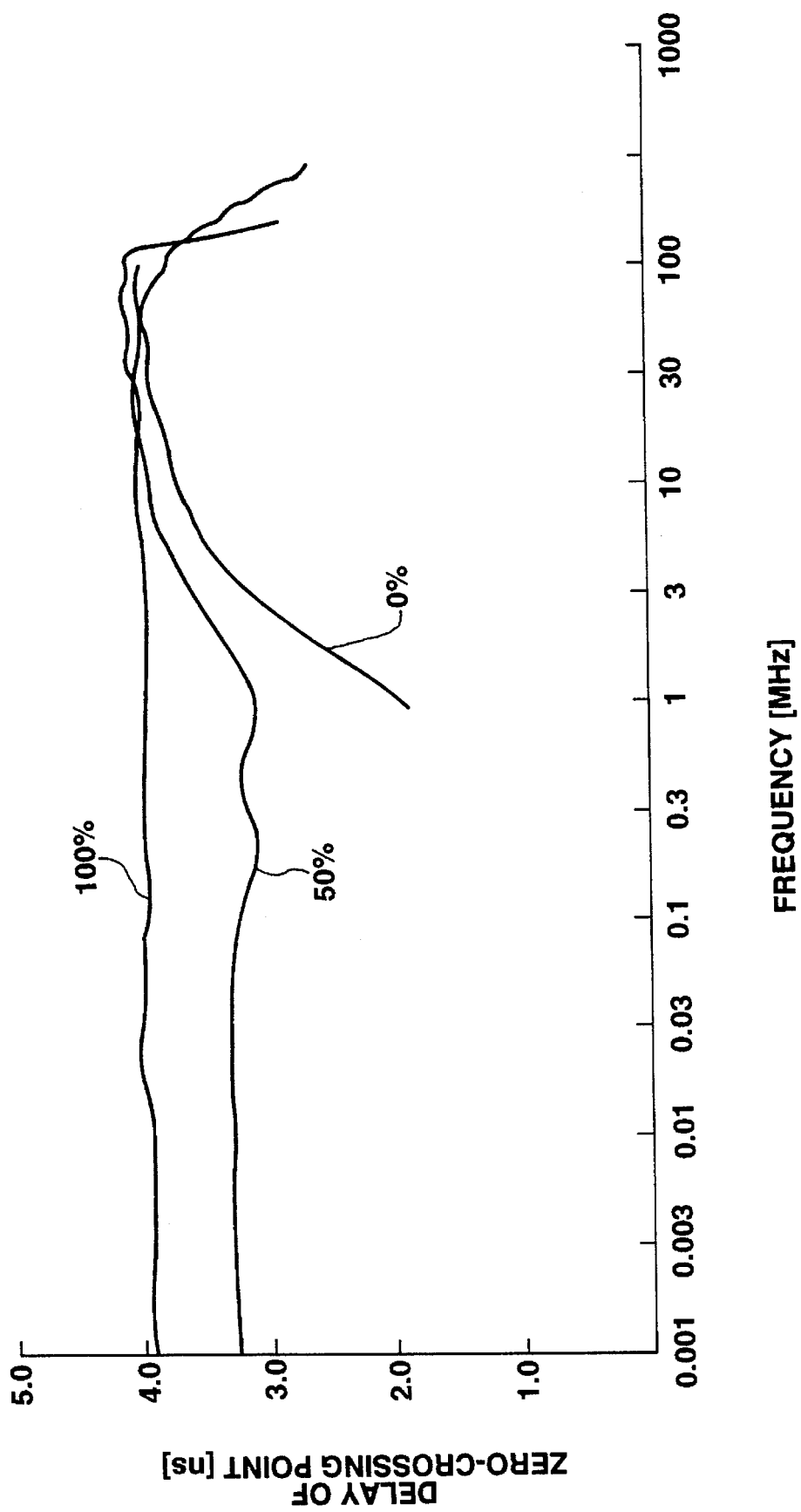
FIG. 7 is a graph showing characteristics of the quantization feedback circuit shown in FIG. 6, with the quantization feedback ratio being changed.

In FIG. 7, the frequency of the input rectangular wave is plotted on the abscissa and the delay time of the zero-crossing point of the output waveform is plotted on the ordinate. With 0% quantization feedback, that is, in the absence of feedback, the signal not higher than 1 MHz is cut off. On the contrary, with 100% quantization feedback, transmission may be achieved up to the low range without time difference. However, the high frequency component is cut off due to insufficient amplitude. If variation or temperature characteristics are taken into account, it is probable that, with the present quantization feedback circuit 8, the signal components with the frequency of not lower than 55 MHz are cut off. Conversely, with 50% quantization feedback, there is produced a difference in the delay time at the high frequency side from that at the low frequency side. However, the data signal can be transmitted over a wide range of frequencies from a low range to a frequency range as high as 150 MHz. This 50% quantization feedback can be realized by setting the amplitude of the feedback signal, which is the output level of the slicer, to 100 mVpp with respect an to input amplitude of e.g. 200 mVpp.

Thus, with the first embodiment of the digital signal recording circuit, while jitter is left to some extent in the quantization feedback circuit 8, transmission over a wide frequency range is realized, and other means are employed in order to reduce the remaining jitter.

With the first embodiment of the digital signal recording circuit, clock signals supplied via the input terminal 3 are also supplied to a frequency divider 10.

The frequency divider 10 has its frequency dividing ratio set to, for example, 2, for halving the frequency of the clock signals. The clock signals, thus set to the same frequency as the maximum basic frequency of the data signal by frequency division by the frequency divider 10, are essentially matched in delay time with the data signal. This facilitates delay time management to render it unnecessary to perform adjustment for diminishing the individual time difference. While the clock signal is of a unitary frequency and hence can be changed in delay time by a simplified primary side filter, the frequency of the clock signal, now lowered by the frequency divider 10, becomes wider in its variable range, thus enabling optimization of the delay time difference. On the other hand, since the frequency of the clock signals are lowered, the transmission waveform may be improved, while the cross-talk to the rotary transformer and the variety of signal lines in its vicinity may be diminished.

The frequency of the clock signal after frequency division is equal to the maximum basic frequency of the video data signal, as discussed above. The clock signals after frequency division are supplied to the primary side core of the clock channel 11 different from the data channel of the rotary transformer.

The clock channel 11 of the rotary transformer transmits the frequency-divided clock signals, fed to the primary side coil on the fixed side, to the secondary coil on the rotary side. The frequency-divided clock signal is of a unitary frequency and hence does not produced jitter even if it is delayed. The frequency-divided clock signal, transmitted by the clock channel 11 to the rotary side, is supplied via a differential amplifier circuit 12 to a slicer 13 and a level detection circuit 14 adapted for converting the input signal into a bi-level signal.

The slicer 13 converts the frequency-divided clock signal into a bi-level signal, that is, into a high logical level signal (H) and a low logical level signal (L). The H signal and the L signal are fed to a frequency step-up circuit 15.

Figure 8:
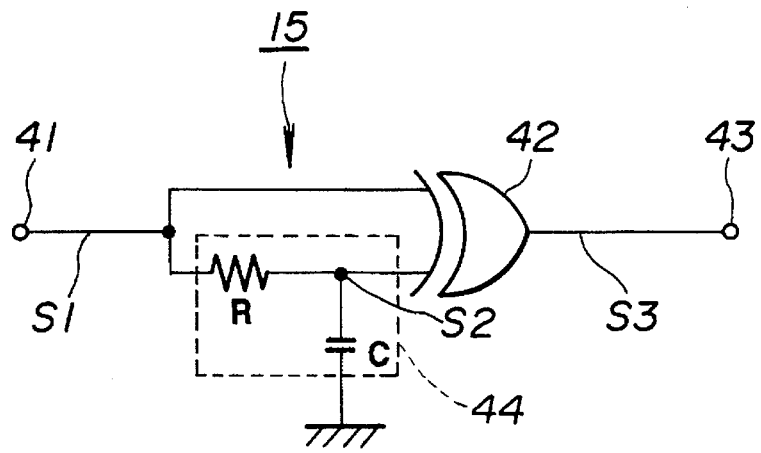
FIG. 8 is a circuit diagram showing a practical frequency step-up circuit employed in the digital signal recording circuit shown in FIG. 5.

The frequency step-up circuit 15 generally is of a circuit arrangement shown in FIG. 8.

Figure 9:
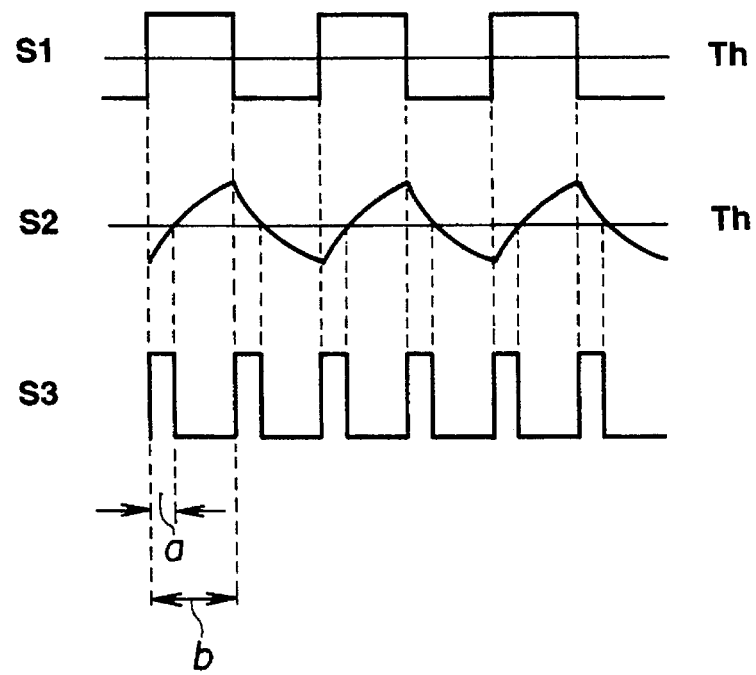
FIG. 9 is a waveform diagram for illustrating the operation of the frequency step-up circuit shown in FIG. 8.

That is, the frequency step-up circuit 15 in general is made up of an integrating circuit 44 comprising a resistor R and a capacitor C, and an exclusive-OR gate 42. The general frequency step-up operation of the frequency step-up circuit is explained by referring to the waveform diagram shown in FIG. 9.

The logical signal, referred to herein as clock pulse signal S1, supplied to an input terminal 41 of the frequency step-up circuit 15, is supplied to an integrating circuit 44, which is made up of the resistor R and the capacitor C and generates a serrated wave signal S2. The clock pulse signal S1 and the serrated wave signal S2 are supplied to an exclusive OR gate 42 which discriminates "0" and "1" from each other based on its threshold value Th. Thus the exclusive OR gate 42 outputs an output pulse signal S3 having the frequency twice that of the clock pulse signal S1. The output pulse signal of the frequency step-up circuit 15 has a duty ratio of a/b and is output at an output terminal 43.

With the present first embodiment of the digital signal recording circuit, employing the frequency step-up circuit 15, performing the above-described general operation, the output signal of the slicer 13 is the clock signal having a double frequency. The clock signal having the double frequency is of the frequency equal to that of the clock signal before entering at the frequency divider 10. Thus it becomes possible with the frequency step-up circuit 15 to realize the clock signal having the correct timing of latching data signals per se. Besides, the frequency step-up circuit 15 is of a simplified structure and hence helps reduce the circuit scale of the present first embodiment of the digital signal recording circuit.

The D-flipflop circuit 9 latches the data signals transmitted from the slicer 7 to the data terminal D with the clock signal supplied to the clock input terminal CL from the frequency step-up circuit 15 for outputting a jitter-free data signal at the output terminal Q. Thus it is possible with the first embodiment of the digital signal recording circuit to diminish jitter by a system distinct from the system centered about the quantization feedback circuit 8.

The output terminal Q of the D-flipflop circuit 9 is connected to a fixed terminal 16b of a changeover circuit 16. The level detection circuit 14 detects the frequency divided clock signal level supplied from the differential amplifier circuit 12 and controls the switching of the changeover circuit 16 depending on the presence and absence of the frequency-divided clock signals. The level detection circuit 14 is constituted by, for example, a full-wave rectifier circuit. The changeover circuit 16 is made up of the fixed terminal 16b, a fixed terminal 16a fed with the transmitted data signal without the intermediary of the flip-flop circuit 9, and a movable contact 16c selectively connected to these fixed terminals.

When the level detection circuit 14 detects the presence of the frequency-divided clock signal, the level detection circuit 14 sets the movable contact 16c of the changeover circuit 16 to the fixed terminal 16b in order to transmit to the differential amplifier circuit 17 the jitter-free data signal which is synchronized by the D-flipflop 9. This causes the magnetic head 18 to record data signals compensated for low range interruption on a magnetic tape, not shown.

When the level detection circuit 14 detects the absence of the frequency-divided clock signal, the level detection circuit 14 sets the movable contact 16c of the changeover circuit 16 to the fixed terminal 16a in order to transmit to the differential amplifier circuit 17 the transmitted data signal which is not passed through the D-flipflop circuit 9. This causes the magnetic head 18 to record data signals compensated for low range interruption on a magnetic tape, not shown.

The reason the level detection circuit 14 detects the presence or absence of the frequency divided clock signals and controls the switching of the changeover circuit 16 for selectively switching the data signal recorded from the magnetic head 18, is to enable the data signal to be recorded even if the frequency-divided clock signals fail to be supplied due to line breakage or shorting.

Meanwhile, if there are a plurality of data channels 4 corresponding to the number of the magnetic heads 18, and one of them should fail to transmit data signals for some reason, it does not mean that data signals become completely impossible to record. Conversely, since only one clock channel 11 is provided and the clocks transmitted thereon are fed to the remaining channels in common, it follows that, if the clock channel 11 should fail to transmit the clock signals for some reason, data becomes completely impossible to record. Thus, should the failure in transmission of the clock signals be detected by the level detection circuit 14, the transmission data signals, which are not transmitted via the D-flipflop 9, are recorded by the magnetic head 18, in order to prevent the situation of complete failure in recording the data signals.

It is seen from the above that, with the present first embodiment of the digital signal recording circuit, 50% of the quantization feedback is applied to the data signals transmitted on the data channel 4 of the rotary transformer for positively transmitting the signals including to the DC components without incurring malfunction, while the transmitted data signals are latched by the D-flipflop circuit 9, using clock signals from the clock signal transmission system having the frequency divider 10 and the frequency step-up circuit 15 for eliminating residual jitter. Thus it becomes possible with the first embodiment of the digital signal recording circuit to transmit the data signals over a wide range from DC to the high frequency without employing the rotary transformer, thereby enabling recording of the digital signals with high signal quality. Since it is not intended to restore the waveform of the transmitted signal by quantization feedback only, matching adjustment to the rotary transformer becomes unnecessary, while it is unnecessary to provide an equalization circuit for waveform equalization of the output of the differential amplifier 5. In addition, since no modem is required, it becomes possible to achieve low production cost and power saving.

By detecting the level of the clock signals transmitted on the clock channel 11 by the level detection circuit 14, the state of failure of transmission of clock signals from the clock channel 11 is grasped, such that, if the data signals from the D-flipflop circuit 9, compensated for low-range cut-off and reduced in jitter, cannot be recorded, only the data signals from the slicer 7 compensated for low-range cut-off can be recorded from the magnetic head 18 on the magnetic tape, so that complete failure in recording the data signals cannot be incurred. Since it is the clock signals halved in frequency by the frequency divider that are detected by the level detection circuit 14, the operating frequency of the level detection circuit 14 can be lowered, thereby enabling facilitated circuit implementation and reducing the power consumption.

In addition, with the present embodiment of the digital signal recording circuit, the delay time of the data signals and that of the clock signals are essentially matched to each other, so that the delay time becomes easier to control and no adjustment is required to shorten the time difference. On the other hand, clock signals are of unitary frequency and can be changed in delay time by a simple first-order filter. However, since the frequency is lowered by the frequency divider, the range of change of the delay time is enhanced and the delay time difference can be optimized more easily. Since the clock signal frequency is now lowered, the transmission waveform can be improved, while the cross-talk to the rotary transformer and the near-by signal limes thereto is also decreased.

The AC erasure signals for a rotary erasure head and clock signals of low-speed logic circuits for a variety of processing operations, as required on the rotary drum, are produced by frequency division from clock signals. With the present embodiment of the digital signal recording circuit, since the signal frequency is lowered to some extent by the frequency divider, there is no necessity of providing a circuit on the rotary drum for dividing the signal frequency.

The clock signal transmitted on the clock channel 11 of the present first embodiment of the digital signal processing circuit may also be employed for latching data signals transmitted by other a plurality of data channels as common clock signals.

Figure 10:
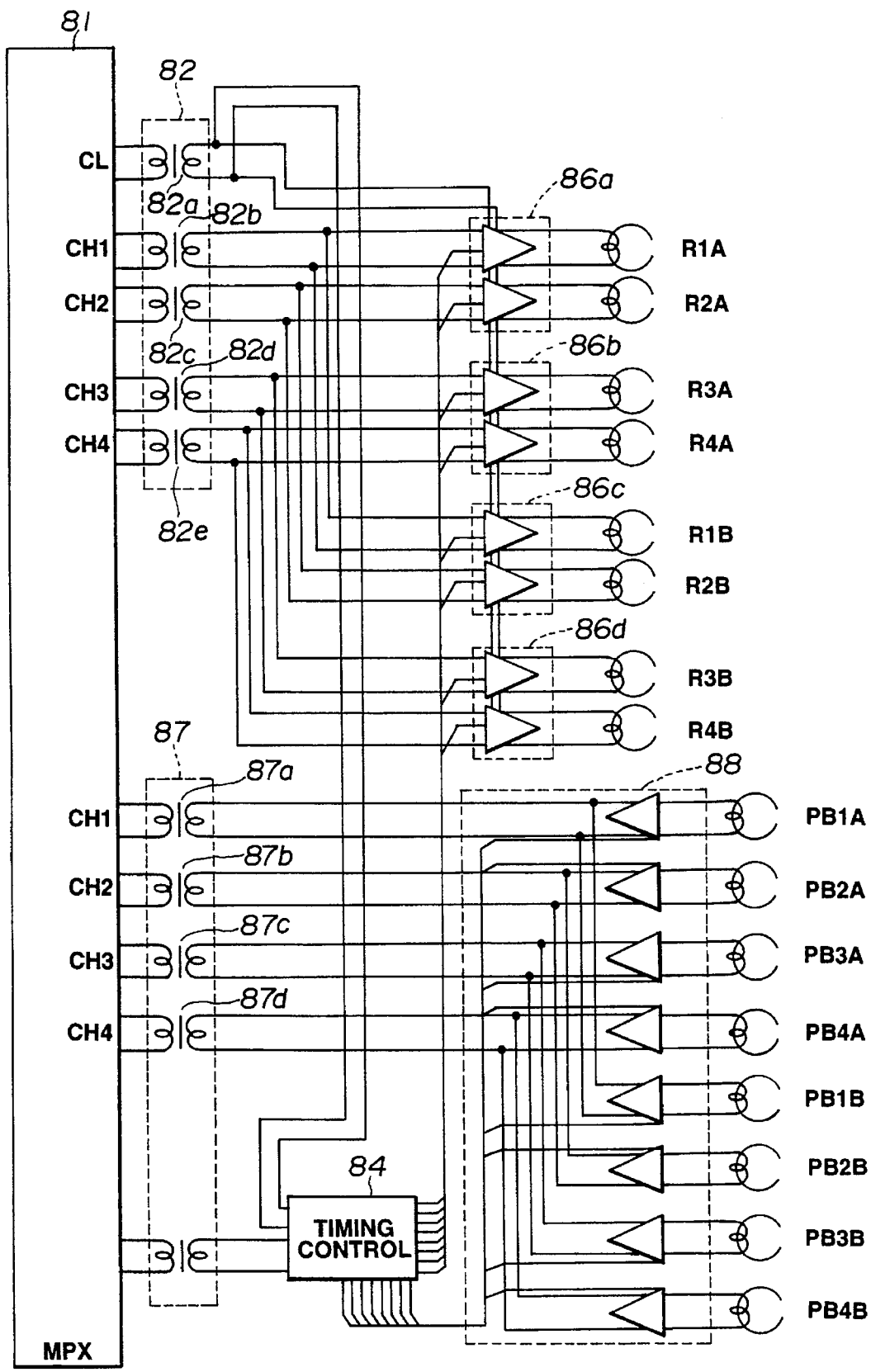
FIG. 10 is a schematic block diagram showing a digital signal recording/reproducing circuit modified from the embodiment shown in FIG. 5.

That is, the present first embodiment of the digital signal recording circuit may also be applied to the digital signal recording/reproducing circuit shown in FIG. 10.

The digital signal recording/reproducing circuit shown in FIG. 10 is employed for recording and reproducing digital signals.

That is, in recording digital signals from a digital signal processing system 81, with the digital signal recording/reproducing circuit shown in FIG. 10, the clock signals transmitted on the clock channel 82a of the rotary transformer 82 are used in common for latching data signals transmitted on data channels 82a, 82b, 82c, 82d and 82e of a rotary transformer 82: The latching performed by employing the clock signals in common is directed by circuits 88a, 88b, 88c and 88d carrying out signal processing similar to that performed by a circuit 35 shown encircled by a broken line in FIG. 5, that is, a circuit composed of bi-level means, quantization feedback means, latch means, level detection means and changeover means. To the circuit 86a are connected recording heads R1A, R2A associated with the data channels 82b and 82c. To the circuit 86b are connected recording heads R3A, R4A associated with the data channels 82d and 82e. To the circuit 86c are connected recording heads R1B, R2B associated with the data channels 82b and 82c and mounted facing the recording heads R1A and R2A at an angle of 180 ° on the rotary drum. To the circuit 86d are connected recording heads R3B, R4B associated with the data channels 82d and 82e and mounted facing the recording heads R3A and R4A at an angle of 180 ° on the rotary drum. For example, the recording heads R1A and R1B are controlled in the data signal supply timing by a timing signal controlling circuit 84.

On the other hand, with the digital signal recording/reproducing circuit, shown in FIG. 10, data signals are read by reproducing head pairs PB1A, PB1B; PB2A, PB2B, PB3A, PB3B; PBA, PB4B, facing each other at an angle of 180 ° as head pairs. The read-out data signals are fed to a signal processing circuit 88 which processes data signals read out by clock signals supplied from a timing control signal 84 and which routes the data signals to playback data channels 87a, 87b, 87c and 87d of the rotary transformer 7. The playback data channels 87a to 87d transmit playback data signals to the digital signal processing system 81.

Figure 11:
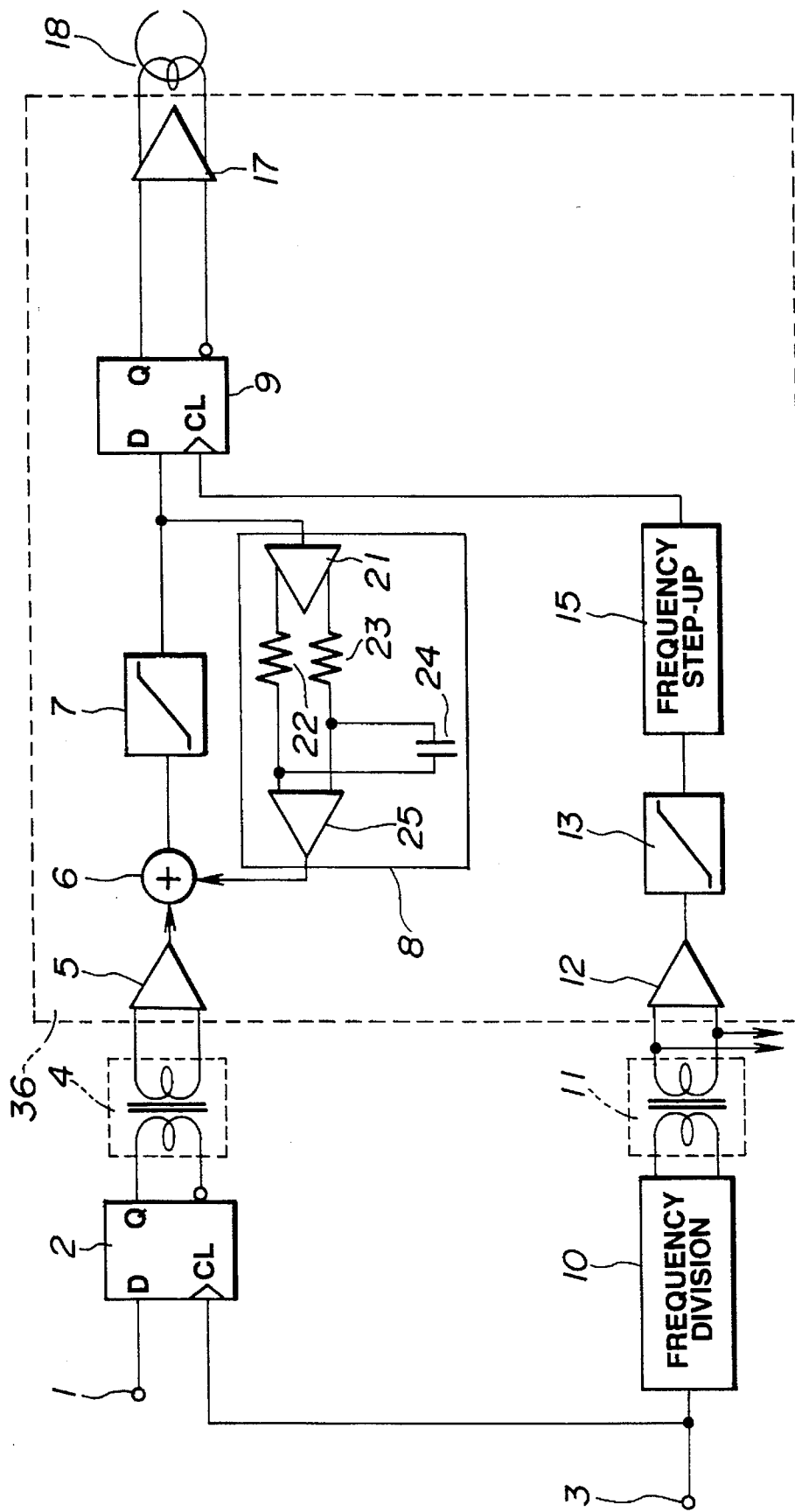
FIG. 11 is a block diagram showing a schematic arrangement of a second embodiment of a digital signal recording circuit according to the present invention.

The second embodiment of the digital signal processing circuit according to the present invention will be explained by referring to FIG. 11. The second embodiment of the digital signal processing circuit differs from the previously described first embodiment in that only the signal output from the output terminal Q of the D-flipflop circuit 9, that is, the data signal compensated for the low-range cut-off and free of jitter, is supplied to the magnetic head 18. That is, with the present second embodiment, the jitter-free data signal of a wide frequency range is recorded from the magnetic head 18 on the magnetic tape.

Figure 12:
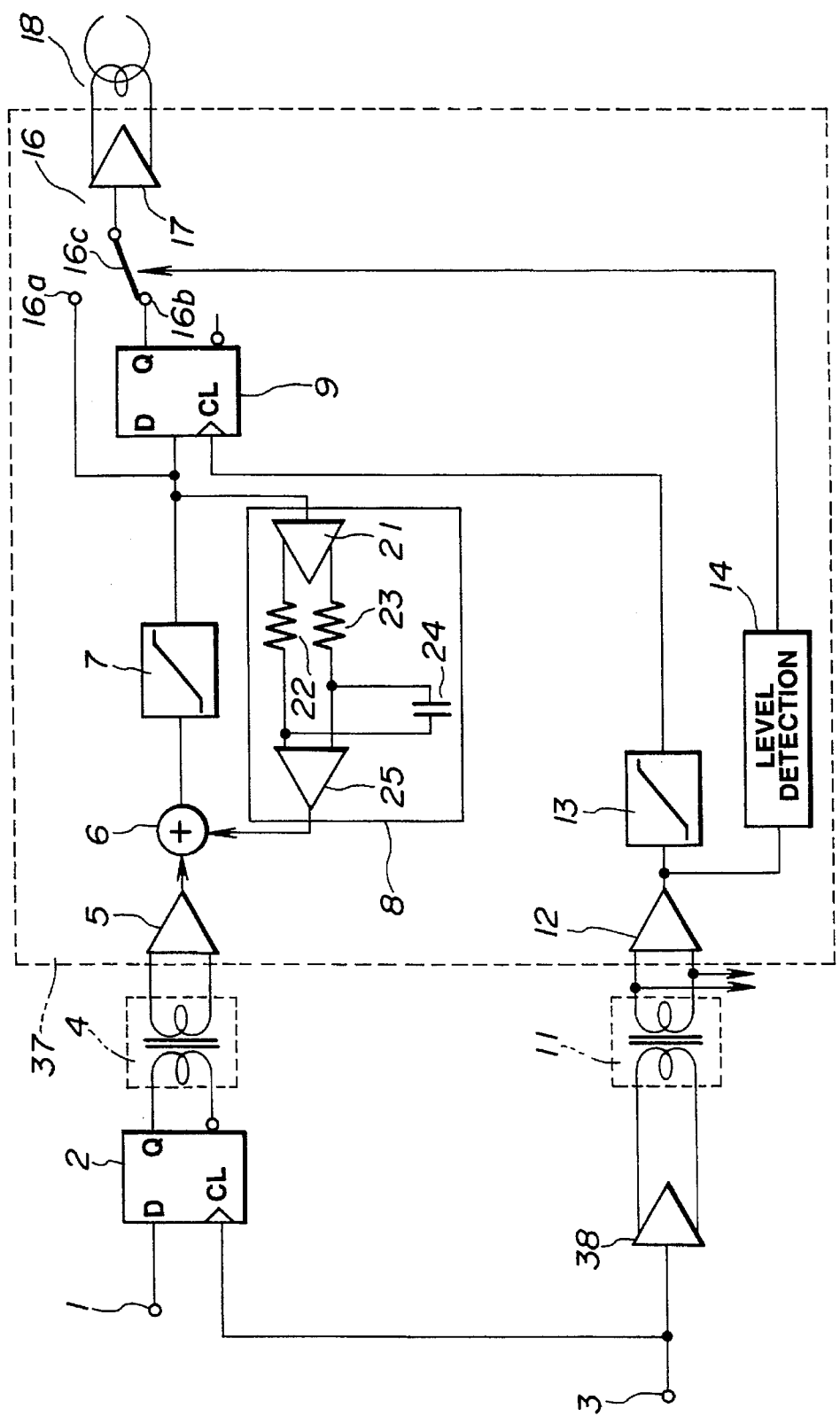
FIG. 12 is a block diagram showing a schematic arrangement of a third embodiment of a digital signal recording circuit according to the present invention.

The third embodiment of the digital signal processing circuit according to the present invention will be explained by referring to FIG. 12. The third embodiment of the digital signal processing circuit differs from the previously described first embodiment in that the clock signals supplied from the input terminal 3 are transmitted on the clock channel 11 to the secondary side, that is, the rotating side, without frequency division. Thus the present third embodiment is not in need of the frequency divider or the frequency step-up circuit. The present third embodiment is otherwise similar in construction to the above-described first embodiment and hence the description is omitted to avoid redundancy.

Since the present third embodiment of the digital signal recording circuit transmits clock signals of a unitary frequency on the clock channel 11 different from the data transmission channel 4 for using the transmitted signals for synchronization in the D-flipflop circuit 9, it becomes possible to record substantially jitter-free transmission signals. By detecting the level of the clock signals transmitted from the clock channel 11 by the level detection circuit 14 for recognizing the state in which no clock signals are transmitted from the clock channel 11, only data signals of a wide frequency range can be recorded from the magnetic head 18 if jitter-free wide range data signals cannot be recorded, so that there is no risk of a total absence of recorded data signals.

The digital signal recording circuit according to the present invention is not limited to the digital signal recording circuits of the above described embodiments.

With the digital signal recording circuits of the above described embodiments, the clock signals for synchronization, employed in the D-flipflop circuit, are produced by transmission by a rotary transformer. It is, however, possible to extract the points of change of the data signals on the rotary side and to average the timing thereof for clock regeneration.

The signal for quantization feedback can be obtained from the output of the flipflop circuit 9 instead of from the slicer output. Although the signals for compensating the low-range cut-off are fed back in the above-described embodiments, feed forward may also be employed for achieving similar effects.

Although the quantization feedback ratio is set to 0.5 in each of the above-described embodiments, any other value less than unity may be adopted for the ratio if such value is in keeping with the circuit for diminishing residual jitter.

With the first and second embodiments of the digital signal recording circuit, the step-up ratio of the frequency step-up circuit is set to 2. This ratio may be changed if it is an integer number multiple in keeping with the frequency divider. The frequency step-up circuit may also be constituted by PLL or high harmonic selection amplification circuit instead of by the combination of the integrating circuit and the exclusive circuit.

With the digital signal recording circuit according to the first and second embodiments, the clock signals reset to the correct frequency by frequency step-up enter the D-flipflop circuit for synchronizing the transmitted data signals. However, the transmission signals may be synchronized by employing a double-edge flipflop circuit without the necessity of employing the frequency step-up circuit.

The changeover means for outputting transmission data signals, containing residual jitter, not transmitted through the D-flipflop circuit, instead of jitter-free broad-range transmission signals synchronized by the D-flipflop circuit, on detection by the level detection means of the state of non-transmission of the clock signals, is not limited to the changeover circuit 16. Thus it is possible to supply in-phase clock signals to master and slave parts of the D-flipflop circuit for transmitting the data signals without time delay for inhibiting synchronization for outputting jitter-containing transmission signals transmitted by the rotary transformer for data.

The level detection circuit may also be constituted by a half-wave rectifier, a gate with hysteresis or a peak detecting circuit, instead of by the full-wave rectifier as described above.

With the above-described embodiments, the slicer is employed as a bi-level means for converting data signals transmitted by the rotary transformer into bi-level values, it is also possible to use a comparator as the bi-level means for converting the data into bi-level data.

With the first and second embodiments of the digital signal recording circuits, the circuits shown encircled by broken lines 35, 38 and 37 may also be constituted by integrated circuits. For example, the circuit shown encircled by the broken line 30 in FIG. 1, namely the differential amplifier circuit 5, adder 6, slicers 7, 13, quantization feedback circuit 8, D-flipflop circuit 9, changeover circuit 16, differential amplifier circuits 12, 17 and the level detection circuit 15, may be constituted by a single integrated circuit having a one-channel recording circuit enclosed therein. Since the frequency step-up circuit is enclosed, high-frequency clocks need not be passed through the pattern on the substrate. Such an arrangement is suitable for handling the waveform characteristics of the clock signals, while the interference with neighboring circuits may also be decreased.

What is claimed is:

1. A digital signal recording circuit for transmitting data signals and clock signals by first and second rotary transformers, respectively, comprising:

quantization feedback means for performing quantization feedback on the data signals transmitted from the first rotary transformer; and latching means for latching data signals quantized and fed back by said quantization feedback means in response to the clock signals transmitted by the second rotary transformer, and further comprising:

frequency dividing means for dividing the frequency of the clock signals supplied to the second rotary transformer; and frequency step-up means for stepping up the frequency of the frequency-divided clock signals transmitted by the second rotary transformer.

2. The digital signal recording circuit as claimed in claim 1, further comprising:

bi-level means for converting data signals transmitted by the first rotary transformer into bi-level signals and wherein the quantization feedback means differentially extracts the bi-level signals from the bi-level means and feeds back the thus extracted bi-level signals.

3. The digital signal recording circuit as claimed in claim 1 wherein a ratio of a feedback signal from the quantization feedback means to the data signals is set to less than unity.

4. The digital signal recording circuit as claimed in claim 1, wherein the second rotary transformer is connected to a plurality of data signal transmitting channels and wherein the clock signals transmitted by said second rotary transformer are fed in common to a plurality of latching means for latching a plurality of data signals transmitted over said plurality of data signal transmitting channels.

* * * * *